April 27, 1954  F. B. ENGEL  2,676,717
CENTERING MECHANISM FOR THE SHOVEL OF SHOVEL LOADERS
Original Filed May 22, 1946  3 Sheets-Sheet 1
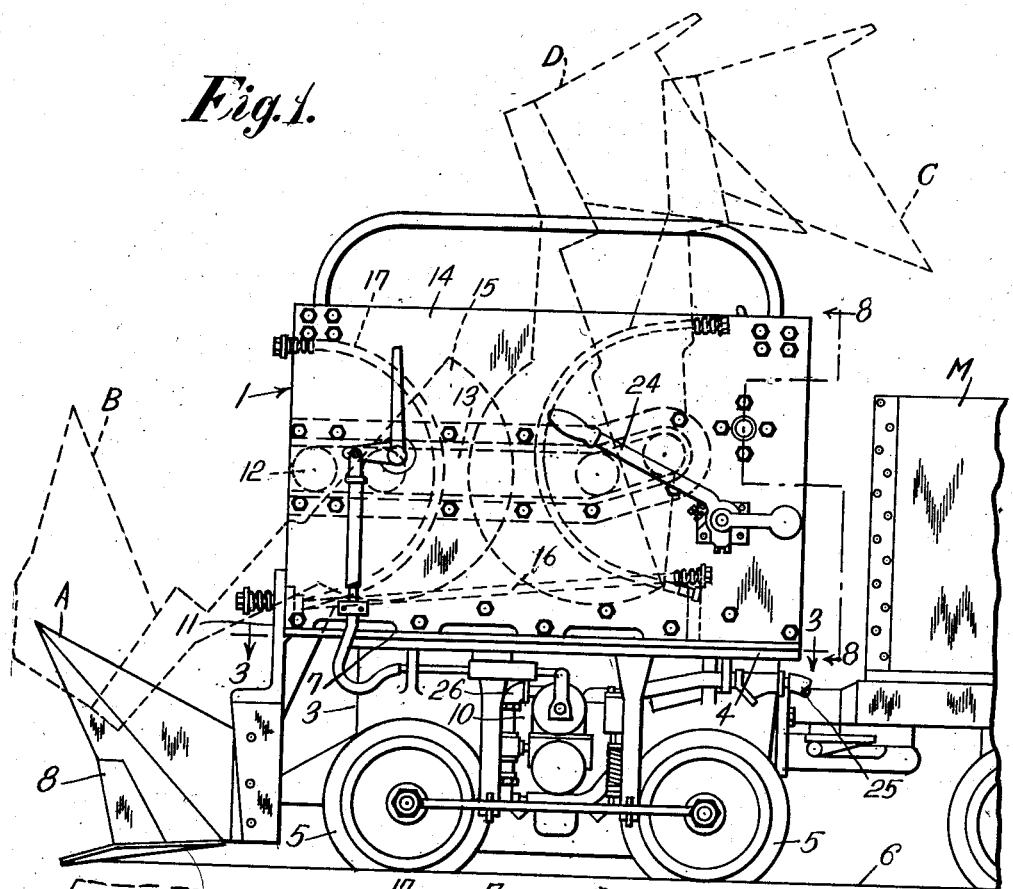
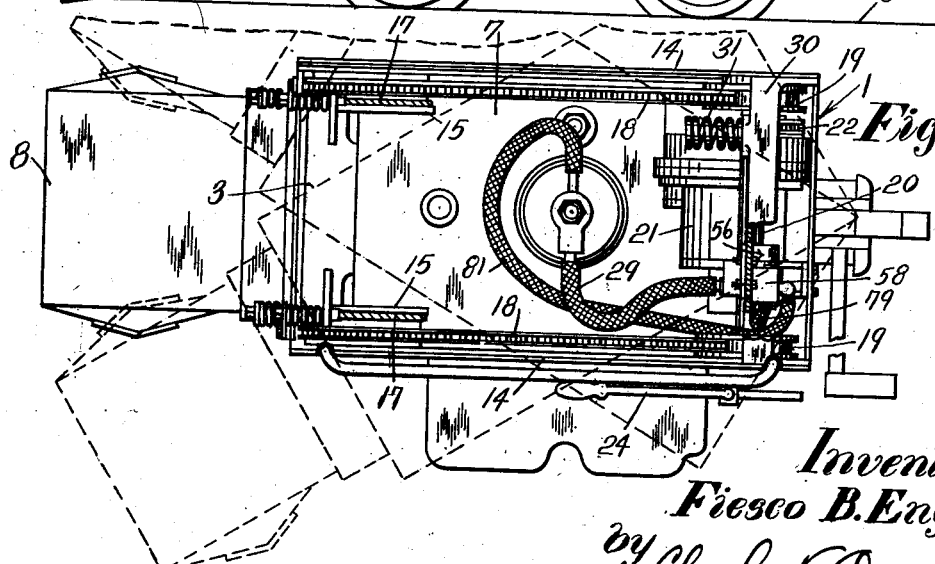
Inventor:
Fiesco B. Engel.
by Charles F. Osgood,
Atty.

April 27, 1954 F. B. ENGEL 2,676,717
CENTERING MECHANISM FOR THE SHOVEL OF SHOVEL LOADERS
Original Filed May 22, 1946 3 Sheets-Sheet 2
*Fig. 3.*
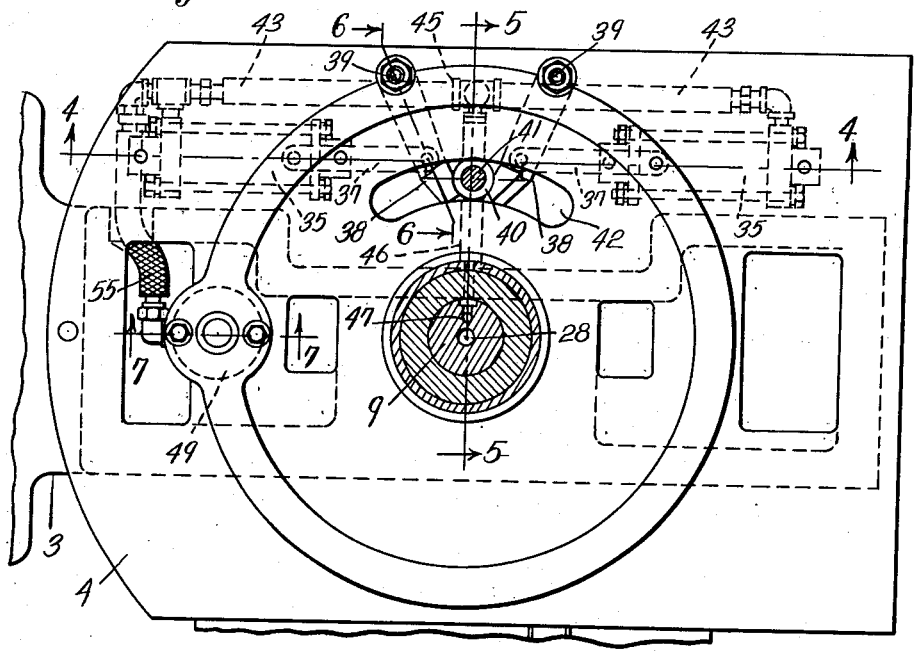
*Fig. 4.*
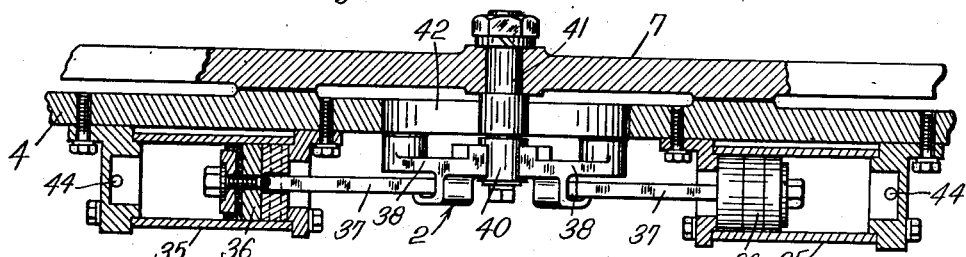
*Fig. 5.*    *Fig. 6.*    *Fig. 7.*
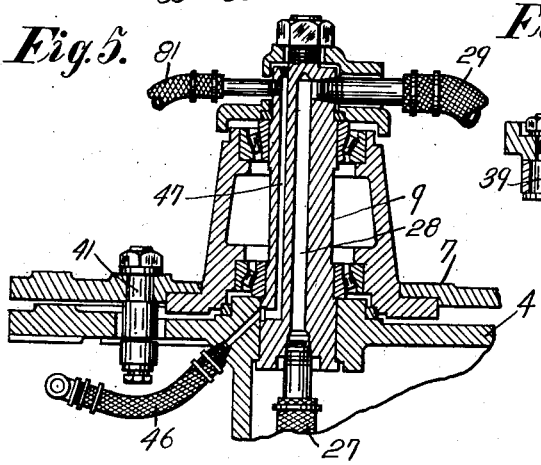 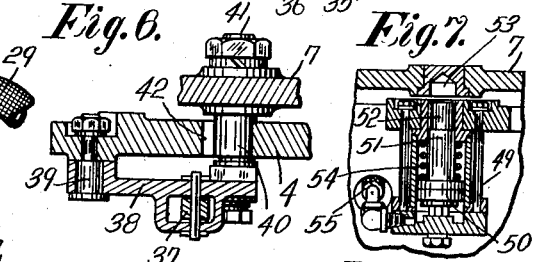
Inventor:
Fiesco B. Engel.
by Charles F. Osgood,
atty.

April 27, 1954    F. B. ENGEL    2,676,717
CENTERING MECHANISM FOR THE SHOVEL OF SHOVEL LOADERS
Original Filed May 22, 1946    3 Sheets-Sheet 3
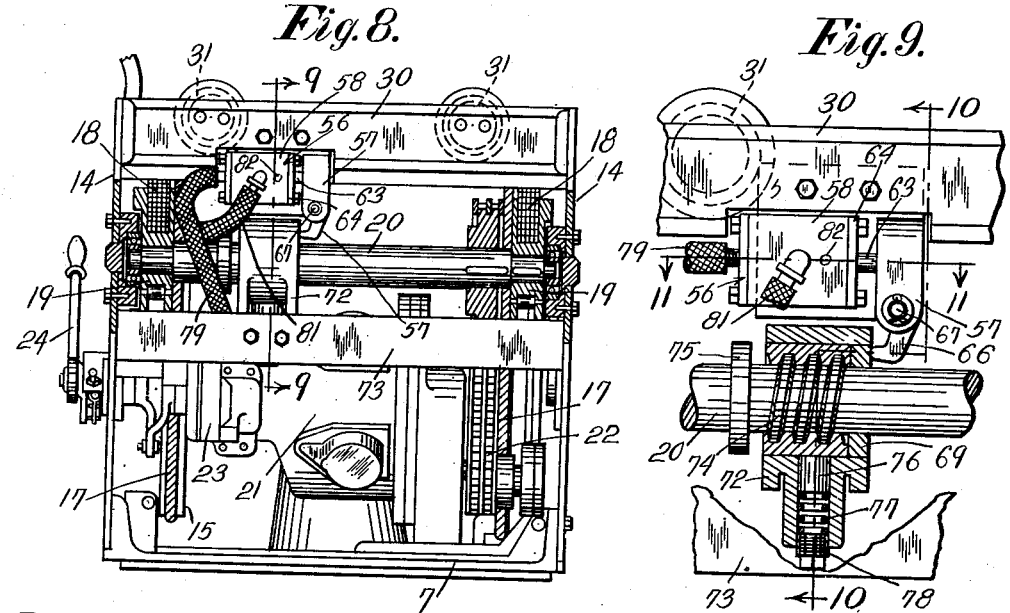
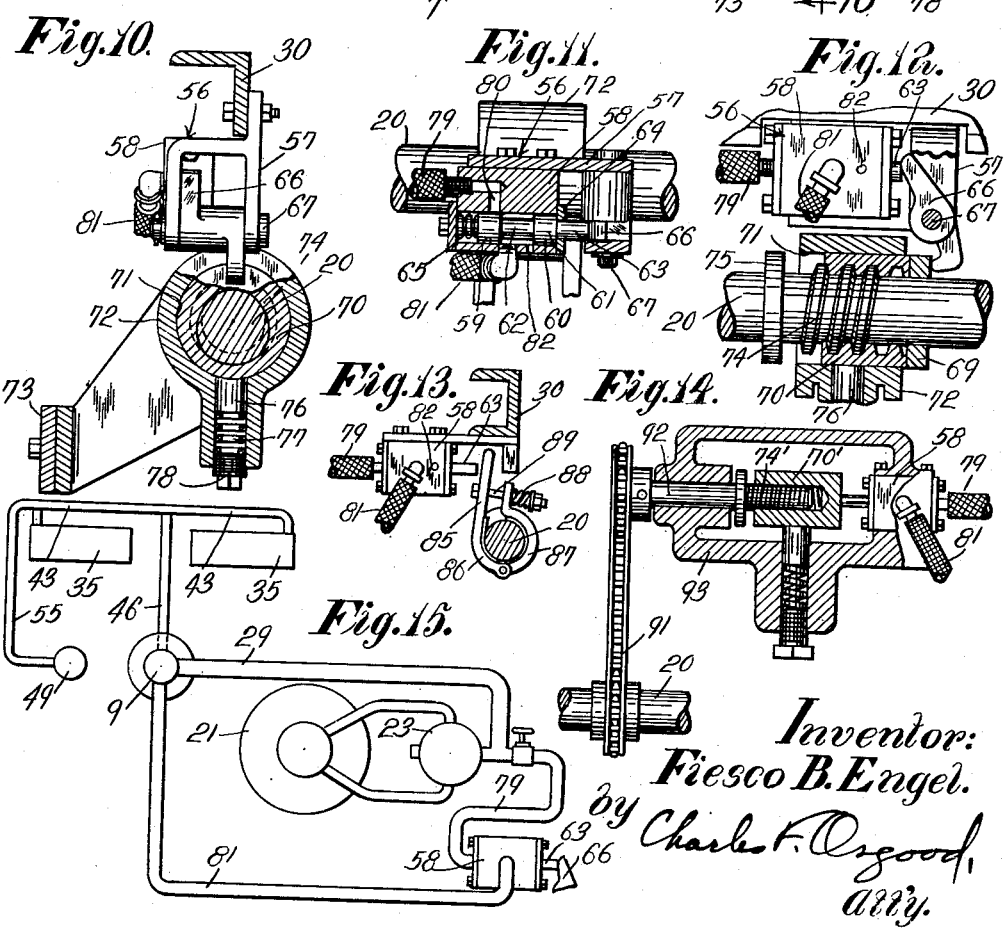
Inventor:
Fiesco B. Engel.
by Charles F. Osgood,
atty.

Patented Apr. 27, 1954

2,676,717

UNITED STATES PATENT OFFICE 2,676,717

CENTERING MECHANISM FOR THE SHOVEL OF SHOVEL LOADERS

Fiesco B. Engel, Claremont, N. H., assignor to Joy Manufacturing Company, Pittsburgh, Pa., a corporation of Pennsylvania Continuation of application Serial No. 671,528, May 22, 1946. This application November 18, 1952, Serial No. 321,233

7 Claims. (Cl. 214—132)

This invention relates to material loading apparatus and more particularly to an improved shovel loader having improved means for automatically centering the shovel with respect to the loader base as the shovel swings upwardly from a laterally located digging position toward its raised dumping position.

In material loading apparatus of the type known as a shovel loader, the shovel is usually mounted on a turntable on a portable base to swing laterally into digging positions at either side of said base, and the shovel is swingable in a vertical direction relative to said turntable between its lowered digging position and its raised dumping position. The shovel is usually swung manually horizontally on its turntable mounting to locate the shovel in the desired digging position at the side of the base, and the shovel after it has been swung upwardly a predetermined relatively short distance sufficient to clear the pile of material to be loaded, is automatically aligned with the base as the shovel continues to be swung upwardly and rearwardly toward its raised dumping position so that discharge of the shovel contents into a mine car, located rearwardly of the loader base, is assured. In certain known types of automatic self-centering means, such as those actuated or controlled by the shovel raising means, it is not possible to swing manually the shovel horizontally into a lateral position until it approaches its lowered position, and, accordingly, the operator must wait until the shovel is nearly lowered before he can manually swing the shovel to one side. Thus such substantial delay in the lateral swinging of the shovel greatly increases the overall loading time.

The present invention, in a preferred embodiment, contemplates an improvement over the automatic centering means of the type above outlined in that the automatic centering means is always automatically rendered inactive as soon as the shovel has moved forwardly a relatively short distance from its raised dumping position so that as the shovel swings forwardly and downwardly, the operator can manually horizontally swing the shovel on its turntable mounting into the desired lateral digging position with respect to the loader base. Thus, in a preferred embodiment of the invention, when the shovel is in a laterally located digging position with respect to the loader base, it starts automatically to center after the shovel has moved upwardly a predetermined relatively short distance so that as the shovel continues to travel through a substantial portion of its upward path, it is in alignment with the loader base; and, conversely, as the shovel starts to return from its raised dumping position, the automatic centering means is automatically rendered inactive so that the shovel can be turned manually horizontally to one side as it continues to move downwardly toward its lowered digging position, thereby increasing the overall loading speed of the loader.

An object of the present invention is to provide an improved material loading apparatus. Another object is to provide an improved shovel loader having improved automatic centering means for the shovel, embodying advantages over certain known types of devices. Another object is to provide an improved shovel loader having improved means for automatically centering the shovel after it has moved upwardly a predetermined relatively short distance sufficient to clear the pile of material to be loaded and, conversely, which is automatically rendered inactive after the shovel has moved forwardly a corresponding predetermined relatively short distance from its raised dumping position. Still another object is to provide an improved shovel loader having improved means for automatically aligning the shovel relative to the loader base after the shovel has moved upwardly a predetermined relatively short distance from its lowered digging position and which is controlled by an element of the shovel raising means. A still further object is to provide an improved automatic centering means of the fluid operated type for automatically centering the shovel of a shovel loader as the shovel moves upwardly a relatively short distance from its lateral digging position and embodying improved control means for venting the fluid in the centering means after the shovel has moved forwardly a corresponding relatively short distance from its raised dumping position. Yet another object is to provide an improved automatic valve means for controlling the supply of operating fluid to the automatic shovel centering means and embodying improved means driven by an element of the shovel raising means for automatically controlling the valve means. Other objects and advantages of the invention will, however, hereinafter more fully appear in the course of the following description.

This application is a continuation of my application Serial No. 671,528, filed May 22, 1946, and now abandoned.

In the accompanying drawings there are shown for purposes of illustration one form and two modifications which the invention may assume in practice.

3

In these drawings:

Fig. 1 is a side elevational view of a shovel loader in which a preferred illustrative embodiment of the invention is incorporated, with different vertical loading positions of the shovel shown in dotted lines.

Fig. 2 is a plan view of the shovel loader shown in Fig. 1, with the lateral digging positions of the shovel shown in dotted lines.

Fig. 3 is an enlarged horizontal sectional view taken substantially on line 3—3 of Fig. 1.

Fig. 4 is a view in longitudinal vertical section taken substantially on line 4—4 of Fig. 3.

Fig. 5 is a cross-sectional view taken substantially on line 5—5 of Fig. 3.

Fig. 6 is a detail vertical sectional view taken on line 6—6 of Fig. 3.

Fig. 7 is a detail view in longitudinal vertical section taken substantially on line 7—7 of Fig. 3.

Fig. 8 is an enlarged cross-sectional view taken substantially on line 8—8 of Fig. 1, looking toward the rear end of the loader.

Fig. 9 is an enlarged detail vertical sectional view, with parts in elevation, taken on line 9—9 of Fig. 8.

Fig. 10 is a detail vertical sectional view taken substantially on line 10—10 of Fig. 9.

Fig. 11 is a horizontal sectional view taken on line 11—11 of Fig. 9.

Fig. 12 is a detail vertical sectional view taken on the plane of Fig. 9, showing the moving parts in a different position.

Fig. 13 is a vertical sectional view illustrating a modified form of the invention.

Fig. 14 is a vertical sectional view showing still another modified form of the invention.

Fig. 15 is a diagrammatic view showing the fluid system and its associated control means.

In the preferred illustrative embodiment of the invention there is shown a shovel loader, generally designated 1, which may be of the same general character as that disclosed in a patent to R. C. Osgood, No. 2,268,569, patented January 6, 1942, and the shovel loader, as embodied herein, embodies improved automatic shovel centering means, generally designated 2, which constitutes an improvement over that of the patent. Evidently, the invention may be embodied in loading apparatus of other types.

The shovel loader herein comprises a portable base 3 having a base frame 4 mounted on wheels 5 adapted to travel along a trackway 6. Swivelled on the base is a horizontal turntable 7 on which a vertically swingable shovel or bucket 8 is mounted. The base frame 4 has fixed thereto a vertical shaft 9 (Figs. 3 and 5) supporting bearings on which the turntable is journaled, and the turntable may be turned on its bearing mounting into positions to locate the shovel laterally at either side of the base, as indicated in dotted lines in Fig. 2, so that the shovel may dig into the material to be loaded at either side of the trackway. As disclosed in the patent above referred to, a conventional reversible fluid motor 10 on the base frame 4 beneath the turntable is operatively connected to the wheels 5 for propelling the loader back and forth along the trackway, and the traction of the wheels is utilized to effect digging of the shovel forwardly into the material to be loaded. Coupled to the rear end of the loader base is a mine car M, having its wheels guided on the trackway.

As is also fully described in the above mentioned patent, the shovel or bucket 8 is supported by arms 11, which carry rolls 12 guided in substantially horizontal guideways 13 on the inner sides of the vertical side plates 14 on the turntable. Thus the rollers provide a rolling pivotal support for the shovel and the shovel supporting arms are swingably supported to turn on axes coincident with the roll support axes as the shovel is swung about its fulcrum point, and as the shovel is swung upwardly from its lowered digging position, the rollers move rearwardly along the guideways and the guideways serve to confine the shovel as it swings upwardly to move in a predetermined curved path. Secured to the arms are segments 15 of semi-circular shape (see Fig. 1) having cable guiding grooves for receiving pairs of flexible spring-tensioned cables 16, 16 and 17, 17, each of which is secured at one end to the shovel arms and at its other end to the turntable frame. These pairs of cables serve to compel swinging movement of the arms, thereby to effect movement of the shovel side arms bodily longitudinally as they are swung, and to provide, in effect, a moving fulcrum point for the shovel; and they serve to effect movement of the shovel through a wide arc as it moves between its lowered digging position and its raised dumping position. The arm segments, roller mounting and cable connections are fully described in the patent above referred to.

For raising and lowering the shovel on its roller mounting, there are provided side chains 18 fastened to the shovel arms and wound on drums 19 (Fig. 8) fixed to a transverse shaft 20 suitably journaled in bearings supported by the vertical side plates 14. A conventional reversible fluid motor 21 is mounted on the turntable and has its power shaft connected through a chain and sprocket drive 22 to the drum shaft 20. The motor has a conventional reversing valve 23 operated by a hand lever 24. This structure is also fully described in the patent above referred to.

Pressure fluid may be supplied to the motors 10 and 21 through a supply hose 25 on the base coupled to branched pipe connections 26 and 27 (Figs. 1 and 5) arranged on the base frame beneath the turntable. The pipe connection 27 is connected to the lower end of an axial passage 28 in the stationary vertical shaft 9 (Figs. 3 and 5) and the upper end of the passage 28 is connected by a flexible hose 29 to the fluid supply for the shovel motor 21. Carried by a cross plate 30 which braces the vertical side plates 14, are spring buffers 31, 31 engageable by the shovel supporting arms 11 to provide a cushioned stop for the shovel when the latter assumes its raised dumping position as indicated in dotted lines at the extreme right in Fig. 1. When the rearward movement of the shovel is abruptly stopped by the buffer springs, the shovel contents are discharged into the mine car M. The buffer springs also initiate forward movement of the shovel from its raised dumping position and when the center of gravity is passed, the shovel will drop down to its digging position under its own weight. To speed up the return of the shovel, the shovel motor 21 is reversed to rotate the cable drums 19 in unwinding direction to slacken the side chains 18 so that the shovel may freely drop down into its digging position. This structure, also, is described in the above mentioned patent.

The automatic centering mechanism 2 serves to align the shovel with respect to the loader base as the shovel moves upwardly from a laterally located digging position so that discharge of the shovel contents into the mine car M is assured. This centering mechanism may be generally similar to that shown in the R. C. Osgood Patent No. 2,365,773, dated December 26, 1944, and comprises aligned fluid motors preferably in the form of fluid cylinders 35, 35 extending longitudinally along one side of the base frame beneath the turntable and containing oppositely acting reciprocable pistons 36, 36. These pistons are pivotally connected by links 37 to horizontally swingable arms 38, 38 pivoted on vertical pivot pins 39 secured to the top of the base frame. These arms are swingable horizontally into engagement with a roller 40 (Fig. 4) journaled on the lower end of a vertical pin 41 secured to the swivelled turntable 7. This pin projects vertically through an arcuate slot 42 struck on a radius from the turntable axis in the top of the base frame. The pin 41 and roller 40 are movable horizontally with the turntable relative to the base frame and the arcuate slot in the top of the base frame permits such movement. Pressure fluid may be supplied to the centering cylinders 35 at the remote ends of the pistons through hoses 43, 43 connected to passages 44 in the outer cylinder head and connected at their adjacent ends by a T 45 to a hose 46, the latter having communication with an axial passage 47 (Figs. 3 and 5) in the shaft 9. The passage 47 has fluid supplied thereto as will later be described. It will thus be seen that pressure fluid may flow from the passage 47 in the shaft 9, through hose 46, T 45, hoses 43, 43 and the passages 44 in the cylinder heads, concurrently to the remote ends of the cylinder bores. Arranged on the base frame beneath the turntable is a vertically disposed fluid cylinder 49 (Figs. 3 and 7) containing a reciprocable piston 50 having its piston rod 51 extending upwardly within the top cylinder head, and the upper end of this piston rod has formed thereon a locking pin 52 which is receivable in a locking recess 53 formed in the turntable 7. A coil spring 54 urges the piston downwardly toward its released position. A hose 55 communicates with the lower end of the cylinder 49 for supplying pressure fluid to the cylinder, and this hose is connected to one of the hoses 43 so that when pressure fluid is supplied to the centering cylinders 35, 35, it is supplied concurrently to the locking cylinder 49. It will thus be seen that when the shovel supporting turntable is power-swung from a lateral position into alignment with the loader base, it is automatically locked in such position by the locking pin 52. When the centering cylinders are vented to atmosphere, the locking cylinder 49 is concurrently vented.

Now referring to the improved automatic control means, generally designated 56, actuated by the shovel raising motor for controlling the supply of pressure fluid to and the venting of fluid from the centering and locking cylinders, it will be noted that mounted on a bracket 57 secured to the cross plate 30 is a valve casing 58 having a horizontal bore 59 (Fig. 11) containing a slide valve 60. The valve has spaced spools 61 connected by a reduced portion 62 and has a valve stem 63 extending outwardly through an outer head 64 of the valve casing. A coil spring 65 constantly urges the valve toward the right as viewed in Fig. 11. The valve stem is engageable by an arm of a lever 66 pivoted at 67 on the bracket 57. The other arm of the lever is engageable by an actuator 69 preferably slidably mounted on the drum shaft 20. This actuator is secured to a rotatable nut 70 having a cylindrical body guided in a bore 71 in a guide frame 72 secured to a transverse member 73 secured to the side plates 14 of the swivelled turntable frame. The nut 70 threadedly engages a screw 74, herein secured to the drum shaft 20. A collar 75 on the shaft limits movement of the nut toward the left as viewed in Fig. 9 while the valve 60, when in its left hand position in Fig. 11, and the lever 66 limits movement of the nut toward the right in Fig. 9. A shoe 76 is held by a spring 77 in frictional contact with the smooth exterior periphery of the cylindrical nut 70, frictionally to hold the latter against rotation until its axial movement along the shaft 20 is limited either by the collar 75 or the valve actuating lever 66 and the valve; and when axial movement of the nut is prevented, the shoe slips to permit rotation of the nut with the screw. A spring 77 is adjustable by a screw plug 78. A hose 79 connects a passage 80 communicating with the valve-receiving bore 59 to the supply hose 29 and a hose 81 communicating with the valve-receiving bore is connected to the upper end of the passage 47 in the shank 9 (Fig .5). The valve-receiving bore is connected to atmosphere by a vent port 82.

When the shovel 8 is in either of its laterally located digging positions shown in dotted lines in Fig. 2 and the motor 21 is operated to raise the shovel from its lowered digging position as indicated in full lines at A in Fig. 1, the drum shaft 20 rotates in a direction to wind in the side chains 18 and concurrently to cause the screw 74 to move the nut 70 toward the right as viewed in Figs. 9 and 12, moving the actuator 69 to swing the lever 66 to shift the valve 60 toward the left as viewed in Fig. 11, thereby to admit pressure fluid from the supply hose 29 and hose 79 past the valve to the hose 81 connected to the passage 47 in the shaft 9 and thence through hoses 46 and 43 to the centering cylinders 35 and through hose 55 to the locking cylinder 49. The pitch of the screw threads is such that the shovel may move upwardly a predetermined relatively short distance sufficiently to clear the pile of material to be loaded as indicated in dotted lines at B in Fig. 1 before the automatic centering means comes into action. When the valve 60 is in its extreme left hand position as shown in Fig. 11, the nut 70 can be driven no farther to the right in Figs. 9 and 12 so that there is slippage between the nut and shoe, permitting the nut to rotate with the screw. As the shovel swings upwardly and rearwardly toward its raised dumping position indicated in dotted lines at C in Fig. 1, the shovel is aligned with the loader base; and when the shovel approaches its dumping position, the shovel side arms 11 engage the buffer springs 31 so that the shovel is abruptly stopped and the shovel contents are discharged into the mine car M. When the shovel is in its raised dumping position, the motor 21 is reversed by the reversing valve 23 to effect slackening of the side chains 18 and the buffer springs bounce the shovel forwardly past its center of gravity, and when the shovel moves forwardly to the dotted line position indicated at D in Fig. 1, the drum shaft 20 is rotated sufficiently in the reverse direction to cause the screw to move the nut toward the left as viewed in Figs. 9 and 12 to permit movement of the valve 60 under the influence of the spring 65 to the position shown in Fig. 1, thereby to connect the pipe 81 to the vent 82 to vent the centering and locking cylinders to render the automatic centering means inactive.

Thus, when the shovel is moved forwardly a corresponding predetermined relatively short distance from its raised dumping position, the automatic centering means is rendered inactive so that the operator can manually horizontally swing the shovel on its turntable mounting into the desired lateral digging position with respect to the loader base as the shovel continues to move downwardly toward its lowered digging position. By enabling manual turning of the shovel as the shovel swings downwardly toward its digging position, the overall loading speed of the loader is substantially increased.

In the modification shown in Fig. 13, the control valve 60 is operated by a lever arm 85 secured to one of a pair of cooperating hinged shoes 86 and 87 lined with friction material and yieldingly held in frictional engagement with the drum shaft 20 by a coil spring 88 engaging a bolt 89 connected between the arm and the free end of the shoe 87. When the drum shaft 20 rotates in a direction to effect raising of the shovel, the friction shoes tend to rotate with the shaft, causing the lever arm 85 to move toward the left as viewed in Fig. 13 to engage the valve stem to shift the valve to effect fluid supply to the centering and locking cylinders. When the drum shaft 20 is driven in the reverse direction during lowering of the shovel, the friction shoes cause the lever arm to move toward the right to permit movement of the valve into its position wherein the centering and locking cylinders are vented. The arrangement of the shoes and lever arm with respect to the valve is such that there is a slight delay prior to operation of the centering cylinders sufficient to permit the shovel to raise a predetermined relatively short distance to clear the pile of material to be loaded before automatic centering occurs, and, conversely, when the shovel starts to move forwardly and downwardly a corresponding predetermined relatively short distance from its raised dumping position, the shoes and lever arm cause the valve to be moved quickly into its venting position thereby to render the automatic centering means inactive.

The modification shown in Fig. 14 is similar to that shown in Fig. 12. In this construction the drum shaft 20 is connected by a chain and sprocket drive 91 to a parallel shaft 92 journaled in a bracket 93 which may be secured to the cross plate 30. Formed on the shaft 92 is a screw 74' threadedly engaging a nut 70'. The control valve, in this instance, is aligned with the screw and nut so that the nut directly engages the valve stem. As in the preferred embodiment, when the drum shaft 20 is rotated in shovel raising direction, the nut 70' is moved by the screw toward the right in Fig. 14 to move the control valve into its fluid supply effecting position thereby to effect operation of the automatic centering means. When the drum shaft 20 is reversed during lowering of the shovel, the screw is reversed, causing the nut to move toward the left to permit movement of the valve into its venting position to render the automatic centering means inactive. Otherwise, the mode of operation of this modified construction is similar to that of the preferred embodiment.

It is accordingly evident that the automatic control means for the centering valve permits the shovel to be raised a predetermined relatively short distance to clear the pile of material being loaded without centering, and after the shovel has been raised sufficiently to clear the pile of material, centering automatically occurs so that discharge of the shovel contents into the mine car M is assured. Also when the shovel moves forwardly a corresponding predetermined relatively short distance from its raised dumping position, the control valve is actuated by the improved control means to effect venting so that the automatic centering means is rendered inactive, thereby enabling the operator manually to turn the shovel into the desired lateral digging position with respect to the loader base as the shovel swings downwardly. As the general mode of operation of the shovel loader of the type disclosed is well known to those skilled in the art and is fully described in the patents above referred to, further description thereof herein is unnecessary. Other uses and advantages of the invention will be clearly apparent to those skilled in the art.

While there are in this application specifically described one form and two modifications which the invention may assume in practice, it will be understood that these forms and modifications of the same are shown for purposes of illustration and that the invention may be further modified and embodied in various other forms without departing from its spirit or the scope of the appended claims.

What I claim as new and desire to secure by Letters Patent is:

1. In a controlling mechanism for a shovel loader of the type comprising a portable base, a frame swivelled on said base to turn relative thereto about a vertical axis, a shovel pivotally mounted on said swivelled frame to swing in a vertical direction relative thereto between a lowered digging position and a raised dumping position, means for swinging said shovel in a vertical direction relative to said frame including a rotatable swing-effecting member operatively connected to said shovel and a rotatable driving element for said rotatable member and power operated means for turning said frame horizontally about its vertical axis relative to said base, the combination comprising means actuated by said driving element for automatically controlling said turning means upon movement of said shovel a predetermined relatively short distance from its lowered digging position to effect operation of said turning means to turn said frame and for rendering said turning means inactive upon movement of said shovel in the opposite direction a corresponding predetermined relatively short distance from its raised dumping position, said controlling means including a rotatable controlling member, means for effecting movement of said controlling member bodily a limited distance relative to said rotatable member and to interrupt such bodily movement, and frictional means for holding said controlling member against rotation during such bodily movement thereof and slipping automatically to provide for rotation of said controlling member upon interruption of bodily movement thereof after said controlling member has travelled such limited distance.

2. In a controlling mechanism for a shovel loader of the type comprising a portable base, a shovel mounted on said base to swing horizontally relative thereto into a laterally located material receiving position at one side of said base, means for moving said shovel upwardly in a vertical direction relative to said base between its material receiving position and its material discharging position and for permitting downward movement of said shovel toward material receiving position, said shovel moving means including a rotatable driving element, and power operated self-centering means for said shovel for aligning the latter with said base irrespective of the horizontally swung position of said shovel relative to said base, the combination comprising means embodying a shiftable control element actuated by said driving element of said shovel moving means for automatically controlling the flow of power medium with respect to said centering means, said control element movable into one position for automatically effecting operation of said centering means shortly after initiation of movement of said shovel upwardly in a vertical direction from its material receiving position and movable into a different position for automatically rendering said centering means inactive shortly after initiation of movement of said shovel from its material discharging position downwardly toward its material receiving position, said automatic controlling means also including a rotatable driving element, and frictional means for holding said control element against rotation with said last mentioned driving element during its actuation by said latter driving element into either of its operating positions, and said frictional means providing for rotation of said control element with said latter driving element when either of said operating positions is reached.

3. In a controlling mechanism for a shovel loader of the type comprising a portable base, a frame swivelled on said base to turn relative thereto about a vertical axis, a shovel pivotally mounted on said swivelled frame to swing in a vertical direction relative thereto between a lowered digging position and a raised dumping position, means for swinging said shovel upwardly in a vertical direction relative to said frame and for permitting lowering of said shovel, said swinging means including a rotatable member operatively connected to said shovel and a driving element for said rotatable member and power operated means for turning said frame horizontally about its vertical axis relative to said base, the combination comprising means embodying a shiftable control element for regulating the flow of power medium to said turning means and for interrupting such flow, said control element actuated by said driving element for automatically controlling said turning means and movable into one position upon movement of said shovel a predetermined relatively short distance upwardly from its lowered digging position to effect operation of said turning means to turn said frame and movable into a different position for rendering said turning means inactive upon movement of said shovel in the opposite direction a corresponding predetermined relatively short distance from its raised dumping position, said automatic controlling means also embodying a drive member for actuating said control element for shifting the latter relative to said drive member into either of said operating positions and means for limiting such movement of said control element in either direction and providing for movement of said control element in unison with said drive member when either of said positions is reached.

4. In a controlling mechanism for a shovel loader of the type comprising a portable base, material loading means supported on said base including a shovel movable upwardly and downwardly between material receiving and discharging positions, means for effecting movement of said shovel between said positions including a reversible rotatable driving element, means including a mounting swingable about a vertical pivot for enabling the positioning of said shovel laterally out of central relation to said base into digging positions at either side of said base and power operable means for applying a centering force to effect movement of said shovel about said vertical pivot from a lateral digging position to a central position with respect to said base, the combination comprising controlling means for said power operable means automatically governed by shovel movement upwardly and downwardly and movable into one position for causing said power operable means to apply a centering force to said shovel upon the completion of a predetermined relatively small portion of the upward movement of the latter and movable into a different position to effect release of said shovel from the centering force applying action of said power operable means upon the completion of a correspondingly relatively small portion of the downward movement of said shovel, said automatic controlling means including a movable control member for regulating the flow of power medium to said centering force applying means and actuating mechanism for said control member including a shiftable element driven by a reversible element of said shovel movement effecting means and moving in one direction as said shovel moves upwardly and moving in the opposite direction as said shovel moves downwardly depending upon the direction of operation of said reversible driving element, means for limiting the travel of said shiftable element in either direction, and means providing for movement of said reversible element relative to said shiftable element when the movement of the latter is limited by said limiting means.

5. A controlling mechanism as set forth in claim 4 wherein said movement providing means comprises a frictional device through which said shiftable element is driven by said reversible driving element until the movement of said shiftable element is interrupted by said limiting means.

6. A controlling mechanism as set forth in claim 5 wherein said shiftable element moves for a short distance during the initial movement of said reversible driving element in either direction of movement of the latter so that when said shovel has moved either upwardly or downwardly substantially its distance of movement, said shiftable element is actuated into positions to effect control of said movable control member.

7. In a controlling mechanism for a shovel loader of the type comprising a portable base, material loading means supported on said base including a shovel movable upwardly and downwardly between material receiving and discharging positions, means for effecting movement of said shovel between such positions including a reversible rotatable drive shaft and an element driven thereby, means including a mounting swingable about a vertical pivot for enabling the positioning of the shovel laterally out of central relation to said base and power operable means for applying a centering force to effect movement of said shovel about said vertical pivot to a central position with respect to said base, the combination comprising automatic controlling means for said power operable means governed by shovel movement upwardly and downwardly and including shiftable control means for regulating the flow of power medium to said power operable means and for interrupting such flow, said control means actuated by said element of said shovel-movement-effecting means and movable into one position for causing said power operable means to apply a centering force to the shovel upon the completion of a predetermined relatively small portion of the upward movement of the latter and movable into a different position to effect release of the shovel from the centering force applying action of said power operated means upon the completion of a corresponding relatively small portion of the downward movement of the shovel, said shiftable control means comprising a control element frictionally mounted on said shaft, stop means for limiting movement of said control element with said shaft to a partial rotation in either direction of movement of said shaft, and a control member for said power operable means actuated in one direction by said control element as the latter is partially rotated by said shaft in one direction, said control element upon movement of said shaft in the opposite direction being effective to permit movement of said control member in the opposite direction.

References Cited in the file of this patent

UNITED STATES PATENTS

| Number | Name | Date |
| --- | --- | --- |
| 1,851,227 | Wittingham | Mar. 29, 1932 |
| 2,132,660 | Stoltz | Oct. 11, 1938 |
| 2,134,582 | Royle | Oct. 25, 1938 |
| 2,231,484 | Stoltz | Feb. 11, 1941 |
| 2,332,522 | Maxson | Oct. 26, 1943 |